United States Patent Office 3,577,322
Patented May 4, 1971

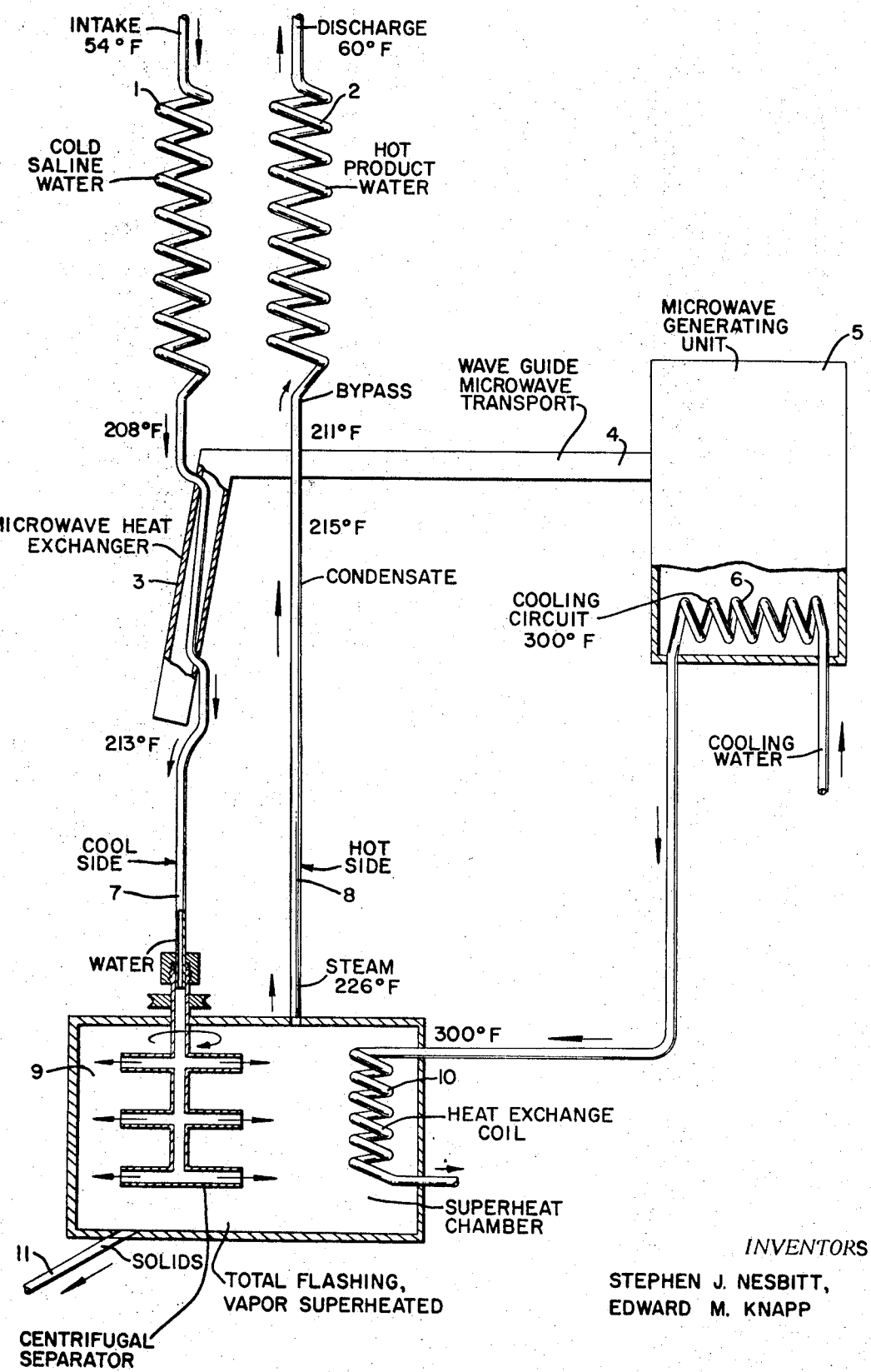

3,577,322
MICROWAVE HEATING IN THE DESALINATION OF WATER
Stephen J. Nesbitt, 1111 Massachusetts Ave., Washington, D.C. 20005, and Edward M. Knapp, 951 N. Livingston St., Arlington, Va. 22205
Filed Dec. 3, 1968, Ser. No. 780,659
Int. Cl. B01d 1/18, 1/02, 3/08
U.S. Cl. 203—11                  1 Claim

ABSTRACT OF THE DISCLOSURE

A system for the single stage flash distillation of saline or polluted water, combining the use of microwave output power as well as the waste heat in the microwave coolant as a source of heat and including centrifugal separation of particulate matter separated from the solute system by the change of state.

This invention is directed to a system for the desalination of water and for the removal from water of many kinds of impurities other than saline matter. It is a continuation-in-part of co-pending application No. 541,172, filed Apr. 8, 1966, now abandoned.

The primary object of the invention is to provide an economical means of desalting water, in units ranging in size from less than 15,000 gallons per day to multi-millions of gallons per day, the small unit being considered a module, expansible to a limited degree as a single unit, such a unit being replicated to form the multi-million gallon a day plant. The major thrust of the system is to the large scale plant in modules so that down time on a single module does not adversely affect the overall capacity of the plant.

The system is applicable not only to the desalination of water but also to the purification of industrial waste water and sewage where the foreign matter can be changed into the particulate state and removed. The system sterilizes any organic organisms present.

The prior art in the field of desalination provides a variety of methods such as distillation, electrodialysis, or separation by differential osmosis through membranes, freezing, humidification, and chemical treatment coupled with solvent extraction. The present method is a new and novel form of distillation, and thus the prior art in the field of distillation must be examined in more detail. The prior in distillation uses either fossil fuel or nuclear energy for the source of heat which causes the water to boil and distill, and uses one of three types of apparatus: (1) multi-stage flash distillation, (2) long tube vaporization, or (3) thin film flash distillation. Each of these is subject to the limitation that the process must be repeated over and over.

The present invention uses microwave energy as the primary source of heat and takes full use of the reuse of heat within the system. Losses of heat to the environment are reduced to a minimum in every operation so that a minimum amount of heat added through microwave is always more than adequate to balance the losses. The reuse of heat provides high efficiency. Microwave as such will be discussed separately, but it is important to point out that the present invention contemplates total distillation in a single stage, of flash distillation, in contrast to the process of the prior art, where a body of water is heated, a small fraction distilled off leaving a liquid containing a higher percentage of the matter designed to be distilled out, this liquid to be reheated and a further small fraction distilled out, this being done time and time again until the matter being distilled out is concentrated in a remainder which is discarded. In the present invention the body of water is heated, 100% distilled out in a single stage, and the matter to be distilled out all removed at that moment. It is the use of microwave energy which makes this possible. At the time of 100% change of state from liquid to gas, the solid matter cannot remain dissolved at all and is centrifugally separated.

Microwave energy directed at water creates heat in situ, equally and simultaneously both at the interface from which microwave energy is introduced and at all distances away from that face, until the energy has been totally taken up by the water. Microwave energy travels as a beam with a width dependent upon the wave length and all water which passes through that beam is heated equally well and at 100% efficiency. Thus the use of microwave energy obviates all questions of heat transfer in that the energy enters into the molecular structure of water. Suitable water heaters thus are used as sensitive and reliable gauges for the performance of other microwave equipment.

Microwave energy is created by an electronic tube, which itself is in no way part of the patentable art of this invntion. Thus we present no drawing or detailed description of the equipment—we just use it. The following explanation is offered to clarify the understanding of those who may use the present invention. The microwave tube generates radiation from a cathode. The radiation takes the form of a series of clumps of electrons moving in straight lines in free space, at distances which correspond to the wavelength generated by an oscillating tuned tube which in effect serves as a gate which cuts high frequency electric current into these clusters. Thus the radiation is not current at all, but a derivative thereof. The oscillator does not itself enter into the production of microwave output power, it only controls the frequency thereof. The process is moderately efficient, efficiency varying with design, but excess energy builds up in the cathode and reveals itself as heat. This heat does not go into microwave output power and is removed by heat transfer to water in a cooling circuit. This heat is available at temperatures up to about 302° F. It may be conveyed into any part of the system of the present invention where it is needed, and is used through normal processes of heat transfer.

The system consists of five operations, as follows: (1) counter-current heat exchange between cold saline water entering the system, and hot fresh water leaving the system; (2) exposure of the saline water from operation 1, now at a temperature of approximately 200° F., to microwave output power; (3) countercurrent heat exchange between the hot saline water from operation 2, now at a temperature slightly in excess of 212° F., with steam at a still higher temperature, the temperature of the steam produced by the use of the heat from the microwave cooling circuit; (4) expansion of the extremely hot saline water from operation 3 into a chamber, this chamber surrounding the apparatus for operation 3, the expansion to be done centrifugally, and the chamber pressure to be at or below atmospheric; (5) return of the condensate from operation 3 to the hot side of operation 1.

The counter-current exchanger in operation 1 is extended in length so that the mathematics of heat exchange are iterated. The cold incoming water is heated to just below the boiling point of water at atmospheric pressure by the time it leaves the operation, and conversely the hot fresh water used is forced to give up within the operation as much heat as is possible under the laws of heat transfer so that the amount required to be dissipated later is minimal.

Operation 2 uses a standard microwave heat exchanger to pass a stream of water through a beam of microwave output power. A microwave heat exchanger is not part of the patentable art of this invention, but it may be described as a portion of a wave guide through which a stream of water passes at a slight angle, this angle being to the longitudinal axis of that section of the wave guide. In the present invention the microwave heat exchanger is oriented so that the stream passes vertically downward, the purpose being to inhibit the deposition of scale.

Operations 3 and 4 can be discussed together since they are the converse of each other and deal with the two sides of a centrifugal heat exchanger. Such a heat exchanger consists of a series of sets of rotating blades, with the inner end of the hollow blade open to a central pipe, the outer end of the blade open to an encompassing chamber, and the channel within the blade being wide and flat. Hot saline water comes up the central pipe, out along the interior surface of the hollow blades where by indirect heat exchange it picks up the latent heat of vaporization from the surrounding steam, and vapor containing particulate matter passes through the outer blade tips to the expansion chamber. Here the steam absorbs still further heat from the heat exchanger surfaces connected to the microwave cooling circuit.

This last absorption of heat creates superheated steam which immediately surrounds the set of rotating blades and transfers the heat of vaporization to the water inside the blades, which is in the form of thin films on the heat transfer surfaces. This process is iterated until the temperature outside the blades drops to that point at which the direction of heat transfer would be reversed. With the condensation taking place the volume of steam is being reduced all the time, maintaining the superheated condition in the steam.

Operation 5 in this system is quite simple. The hot fresh water produced by the condensation of steam flows to the hot side of operation 1 and the circuit is complete.

A word is required as to the centrifugal nature of the separation of solids from liquids in this system. Solution of the solids depends upon the liquid state of the material in which they are dissolved. When the liquid is turned 100% into the gaseous state the dissolved solids can no longer remain in solution and they become particulate solid matter. The key to this is the 100% conversion of the liquid into gas, a result not possible in the prior art and obtainable in the present invention by the use of microwave energy. The change of state process takes place here in a centrifugal system which causes the particulate matter to fly in straight lines beyond the boundaries of that space occupied by the steam. No liquid moisture remains in the steam to impede this process. Because of its lesser density relatively, the steam is not greatly influenced by the centrifugal forces and a spatial separation is achieved.

The patentable art here runs to the combination of microwave with the other elements cited. Sterilization of all organic material present is accomplished by two mechanisms: (1) The temperatures above 212° F. (2) The high electronic flux created within the water by microwave energy.

Having thus defined the invention we further define it by the drawings which are attached as part of the specification. It will be noted that the drawing used for the co-pending application, Ser. No. 541,172, of which this is a continuation in part, is not used, and a new drawing is submitted which is informal in character. Prior to issuance of the resulting Letters Patent this drawing will be brought up to standard.

The figure is a schematic flow chart of the present invention. The cold side of a counter current heat exchanger 1 is matched by the hot side of the same counter current heat exchanger 2. The microwave heat exchanger is represented by a section of wave guide 3, which is backed up by a transmission apparatus for microwave energy 4, this consisting of a wave guide of proportions congruent with the frequency applied. The microwave generator 5 is not shown in any detail since the unit is positioned apart from the system and is not part of the patentable art. Such a unit contains a power source, linked to electric power, and the generator tube. The flow of water is shown moving transversely to the microwave heat exchanger 3, at the slight angle which is part of that art.

The enclosed and closed channels of the centrifugal heat exchanger 7 are matched by the encompasing and open space 8 of such a centrifugal heat exchanger. The colder side is denoted 7 and the hotter side is denoted 8. Water discharged from the colder side 7 moves into steam chest 9 under expansion conditions at pressures not to exceed atmospheric and subject to reduction. The steam leaves steam chest 9 and moves to the hotter side of the centrifugal heat exchanger 8. Hot fresh water moves from heat exchanger 8 to the hot side of the previously cited heat exchanger 2 and eventually is discharged as product water, to be aerated or otherwise made potable by conventional means.

Cooling water circuit 6, a part of the complex of the microwave generator removes from that generator electric energy not turned into microwave output power and carries it as sensible heat in a stream of water. This heat is delivered to the steam chest 9 by heat exchanger coils 10. Sources and delivery point of the water in the cooling circuit 6 are separate entirely from the desalination system as such. Discharge means for the salt and other solid impurities removed at 11 are conventional in nature. Direction of movement of the water undergoing processing are shown by arrows.

It will be noted that temperatures have been noted on the drawing at the appropriate places. These temperatures are approximate and are not to be used to limit the scope of the invention. As a case in point, the cooling circuit may be operated at temperatures up to 302° F. Furthermore a different tube might be used than the one cited in which the efficiency is 50%. Efficiencies of up to 90% are available. Such a configuration of the system would provide less heat from the cooling circuit, but it might be at higher temperatures, thus modifying the overall temperature of the steam in the steam chest. The temperatures are listed merely to indicate that attention has been paid to the thermodynamics of the system.

The patentable art runs to that shown in co-pending application No. 541,172 to which has been added the method that pertains to the centrifugal heat exchanger. It is understood that the invention is not limited precisely to the statement shown and that a flexibility in the selection of equipment to operate the system is retained.

Having thus described the invention, we claim:

1. A method for the desalination and purification of water consisting of indirect countercurrent heat exchange between cold saline water and hot condensate leaving the system to preheat the saline water; exposing the preheated saline water to microwave energy to further heat the saline water to 213° F.; passing the further heated saline water into indirect counter current heat exchange with superheated steam derived from a subsequent step to completely vaporize the saline water; centrifuging the vaporized saline water to separate the vapor from the salt; heating the separated vapor by indirect heat exchange with liquid conveying waste heat from the source of microwave energy to provide said superheated steam previously mentioned; and passing said superheated steam, after delivering some of its heat to the vaporized saline water, to the initial countercurrent saline water preheat exchange to leave the system as said fresh water condensate.

References Cited

UNITED STATES PATENTS

| 2,472,562 | 6/1949 | Bierwirth | 159—47 |
| 2,520,186 | 8/1950 | Von Platen | 23—295 |
| 2,690,465 | 12/1954 | Kittredge | 203—10X |
| 3,072,490 | 1/1963 | Sargeant | 99—205 |
| 3,204,687 | 9/1965 | Sargeant | 159—6 |

FOREIGN PATENTS 667,359  10/1929  France _____ 159—47

WILBUR L. BASCOMB, Jr., Primary Examiner

J. SOFER, Assistant Examiner

U.S. Cl. X.R.

159—3, 6, 46; 202—177, 182; 203—47, 88, 100